Patented Feb. 27, 1940

2,191,666

UNITED STATES PATENT OFFICE 2,191,666

TOOL ELEMENT

Richard Kieffer, Reutte, Austria, assignor to The American Cutting Alloys, Inc., New York, N. Y., a corporation of Delaware No Drawing. Application January 13, 1936, Serial No. 58,991. In Germany January 12, 1935

6 Claims. (Cl. 75—136)

(Granted under the provisions of sec. 14, act of March 2, 1927; 357 O. G. 5)

This invention relates to a tool element consisting of a shank of any suitable material such as steel, and a layer thereon consisting of hard alloy. Tool elements of this type are used for various purposes and among others for drilling and mining.

It is an object of the invention to secure a hard and tough layer of a hard alloy on the shank.

It is another object of the invention to render the layer more wear-resistant than heretofore.

It is another object of the invention to make such a layer more efficient and its manufacture and operation secure and nevertheless cheaper than heretofore.

According to this invention, the hard alloy which is to be welded directly and without any intermediary, such as a solder, upon the shank is composed of such material in such relative amounts which insure that the welding temperature of the solidified mixture does not differ from that of the shank material to such an extent as to incorporate substantial amounts of the shank material in the hard alloy when welding it upon the shank.

According to the invention the hard alloy is composed of metal selected from the sixth group of the periodical system melting above 2000° C. Such metals are in particular tungsten, molybdenum. The amount of these metals exceeds 50% so that they form the main portion of the final hard alloy. Sufficient carbon exceeding 3% is added to the hard alloy to combine with the metal of the sixth group melting above 2000° C., thereby forming carbide. For instance tungsten carbide may be formed of any known constitution such as WC, or W₂C. The formation of carbide may occur during formation of the alloy itself as it will be described hereinafter. The carbide may also be formed before admixing the other constituents of the alloy by proper heat treatment of adequate amounts of tungsten, or molybdenum and carbon. There is further added metal of the iron group in substantial amounts, but to form a minor portion of the final hard alloy. Iron, cobalt, or nickel alone, or in any desired mixture may thus be applied. The amount of metal of the iron group is advantageously within about 25% to about 35% by weight of the final hard alloy. There is also added a metal selected from the sixth group but melted below 2000° C., preferably chromium. This metal is added in substantial amounts between about 10% to about 15% by weight of the final hard alloy.

A hard alloy of this composition has proved to be very wear-resistant and hard; a hardness up to about 80 to 86 Rockwell. This hard alloy also retains its resistivity at highly elevated temperatures occurring during operation and is therefore stable in the heat.

If tungsten carbide or molybdenum carbide are used as available in commerce, there usually is an admixture of silicon present, such silicon forming a substantial amount up to about 1% by weight of the final hard alloy. Its presence proved advantageous to the stability of the hard alloy at elevated temperatures and it increases its hardness.

According to the invention substances of the nature of silicon may be added intentionally. Thus, substances of metalloidal character like silicon may be added which are silicon itself, titanium, zirconium and boron. The amount of these additions may exceed 1%, and may be 2%, up to about 6%.

The substances of metalloidal character may be added either as such, or in form of their carbides. There may also be allowed carburation of these substances by carbon added or taken from the crucible during formation of the hard alloy, or its welding upon the shank. It results therefrom that the carbon present in the hard alloy may amount to more than 3% to about 6% by weight of the final hard alloy.

In preparing the hard alloy one may proceed in any well known way. Thus, the constituents may be powdered, if necessary, then mixed and pressed into any desired shape, such as plates or rods. The body may then be heated in order to solidify it. It is possible to heat it so far that at least the lower melting material present is melted. However, also the entire mixture may be melted. It is well known that the melting temperatures of tungsten and molybdenum are materially reduced in presence of alloying lower melting metals such as iron, or nickel.

If high sintering is attempted a eutectic frequently forms which prevents a real high sintering. Therefore, according to this invention consolidation by heat treatment is done below high sintering temperature preferably within a range from low sintering temperature up to below high sintering temperature of the particular mixture. Bodies so obtained are called in the claims "baked bodies."

In general, heating between about 1000 and 1100° C. up to about 1300° C., sometimes up to 1500° C., will render solid bodies sufficiently strong so as to be handled, and shaped and welded upon the shank.

Instead of pressing the mixture at high pressure, any binding material may be used, such as tragacanth, dextrine or the like, and the mixture shaped and sometimes pressed, but then not necessarily with high pressure, whereupon heat treatment is effected.

By way of example the following mixtures which have proven useful in practice may be mentioned:

About 51 to 60% tungsten,
More than 3 to 6% carbon,
About 2 to 6% titanium,
About 10 to 15% chromium.
The remainder substantially iron.

Another mixture consists of:

About 52% to about 69% tungsten carbide,
About 1% to about 3% titanium carbide,
About 25% to about 37% cobalt, and
About 10% to about 15% chromium.

While in such cases the mixture containing carbon may be shaped or pressed and heated whereby carburation occurs when heating is done for a sufficiently long period of time, up to about 2 to 4 hours, there may also be introduced carbon in form of carbide of the selected metal. Or the selected carbides will be mixed in powdered form with the other constituents, and then shaping and heat treatment are effected in the same way as described above for the mixture containing the uncombined constituents only.

If metal of metalloidal character is intentionally to be added, it may also be introduced either as such or already in the form of powdered titanium carbide, silicon carbide, zirconium carbide and/or boron carbide.

The alloy or solid mixture so obtained is now to be welded upon the shank. This is done by heating the alloy up to or almost to its melting temperature. If the alloy forms a rod one of its ends is to be melted for instance by means of an electric arc in a hydrogen atmosphere and is to be permitted to drop upon the shank which is sufficiently heated. There may also be caused an arc between the end of the rod of hard alloy and the place of the shank upon which the former is to be welded, so that the rod end melts and combines with the shank forming thereon the desired layer. Also a sheet may be formed of hard alloy, or a plate, having the desired thickness and probably other desired dimensions, and this sheet or plate may be combined with the surface of the shank forming the desired layer.

It is understood that any other way of combining in the heat or welding the hard alloy upon the shank may be used, as well as upon any other working appliance.

The welding temperature of an alloy according to this invention will be close to the melting temperature of the shank, so that no material amounts of it be melted during the welding operation and no substantial mixing between the shank material and the hard alloy and thereby dilution and change of the latter will occur.

The temperature of the welding may lie between about 1500 to 1800° C., and is therefore quite close to the melting temperature of the shank.

As far as the manufacture of the hard alloy body is concerned, there may also be mentioned heating a mixture of tungsten, chromium, iron and titanium in a graphite crucible at a temperature sufficient to melt down at least the iron and chromium. This minimum temperature is retained until carbon of the graphite crucible is taken off by the melt to such a degree that the desired carbides of tungsten and titanium are formed. The melt may then be cast in any desired shape. It may also be proceeded in such a way that carbides of tungsten and titanium are formed and comminuted, and then combined or alloyed by means of a melt consisting of chromium and metal of the iron group whereby a type of sintered, particularly low sintered body results.

As mentioned above, temperatures of about 1100 to 1300° C. are already sufficient both for carbide formation and low sintering. The degree of carbide formation depends upon the duration of this heat treatment.

It is to be understood that the invention is not limited to any of the examples given as to the constitution of the hard alloy or the method of its manufacture, or its combination with or welding upon the shank, but is described in its broadest aspect in the appended claims.

What I claim is:

1. An alloy adapted to be welded directly upon a ferrous support, such as a tool shank, consisting substantially of more than 50% metal selected from tungsten and molybdenum, a minor portion of metal selected from the iron group, appreciable amounts up to about 6% of a substance of metalloidal character selected from a group consisting of titanium, zirconium and silicon, about 10% to about 15% chromium, and carbon in an amount sufficient to form carbide with the first-named metal present in the hard alloy and substantially forming such carbide therewith, the proportions of said constituents selected so that the welding temperature of the alloy is close to the melting temperature of said ferrous support.

2. An alloy adapted to be welded directly upon a ferrous support, such as a tool shank, consisting substantially of more than 50% metal selected from tungsten and molybdenum, a minor portion of metal selected from the iron group and appreciable amounts up to about 6% of a substance of metalloidal character selected from a group consisting of titanium, zirconium and silicon, about 10% to about 15% chromium, and carbon in an amount exceeding 3% and sufficient to form carbide with the first-named metal and said substance present in the hard alloy and substantially forming such carbide therewith, the proportions of said constituents selected so that the welding temperature of the alloy is close to the melting temperature of said ferrous support.

3. An alloy adapted to be welded directly upon a ferrous support, such as a tool shank, consisting substantially of more than 50% and up to about 60% metal selected from a group consisting of tungsten and molybdenum, about 2% to about 6% of a substance selected from a group consisting of titanium, zirconium and silicon, carbon in an amount exceeding 3% and sufficient to form carbides with said metal and said substance selected and forming substantially carbide therewith, about 25% to about 34% metal selected from the iron group, and about 10% to about 15% chromium, the proportions of said constituents selected so that the welding temperature of the alloy is between about 1500° C. to 1800° C.

4. An alloy adapted to be welded directly upon a ferrous support, such as a tool shank, and obtained by heat treatment at temperatures between, and including, low-sintering and high-sintering temperatures, substantially consisting of more than 50% and up to about 60% tungsten, about 2% to about 6% titanium, more than 3% up to about 6% carbon, about 25% to about 34% iron, and about 10% to about 15% chromium.

5. A shaped layer of hard alloy welded directly within a temperature range of about 1500° C. to about 1800° C. upon a ferrous support, such as a tool shank, said hard alloy consisting of about 52% to about 69% tungsten carbide, about 1% to about 3% titanium carbide, about 25% to about 37% cobalt, and about 10% to about 15% chromium.

6. A shaped layer according to claim 5, containing substantial amounts of silicon.

RICHARD KIEFFER.